Feb. 11, 1958     P. E. CORSON     2,822,878
WALKING TRACTOR

Filed Jan. 7, 1954     5 Sheets-Sheet 1

INVENTOR
Paul E. Corson
BY
ATTORNEYS.

Feb. 11, 1958 P. E. CORSON 2,822,878
WALKING TRACTOR
Filed Jan. 7, 1954 5 Sheets-Sheet 2

INVENTOR
Paul E. Corson
BY
ATTORNEYS.

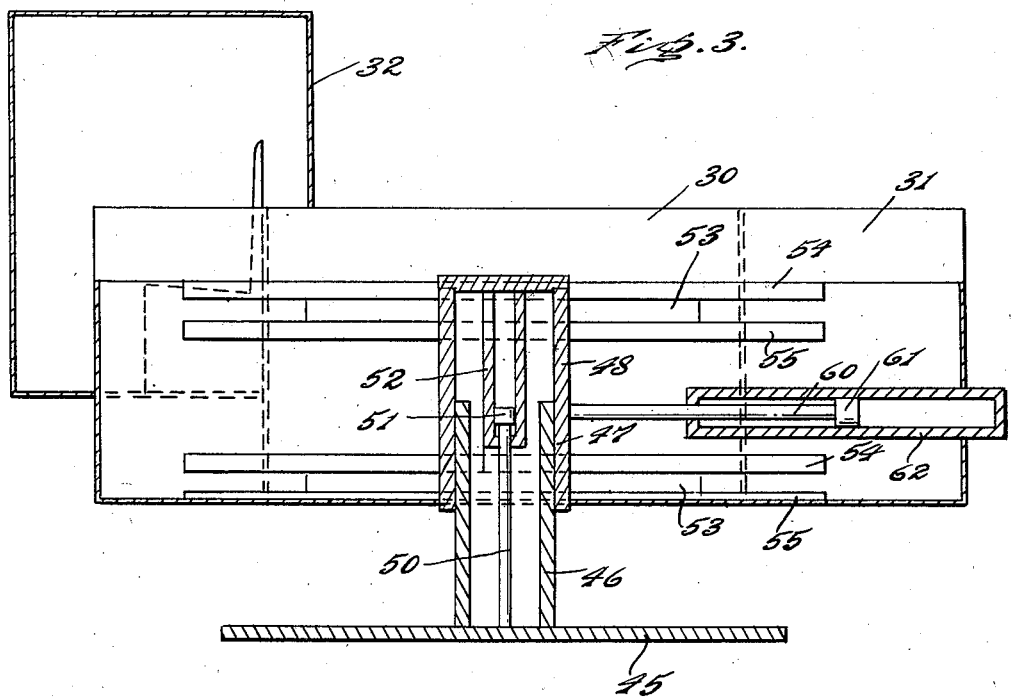
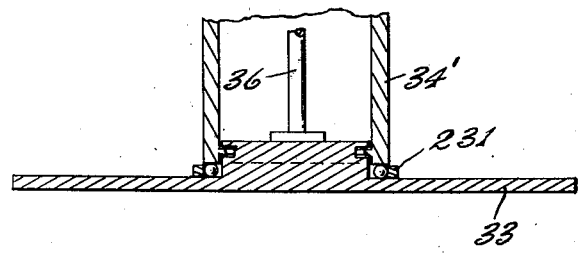

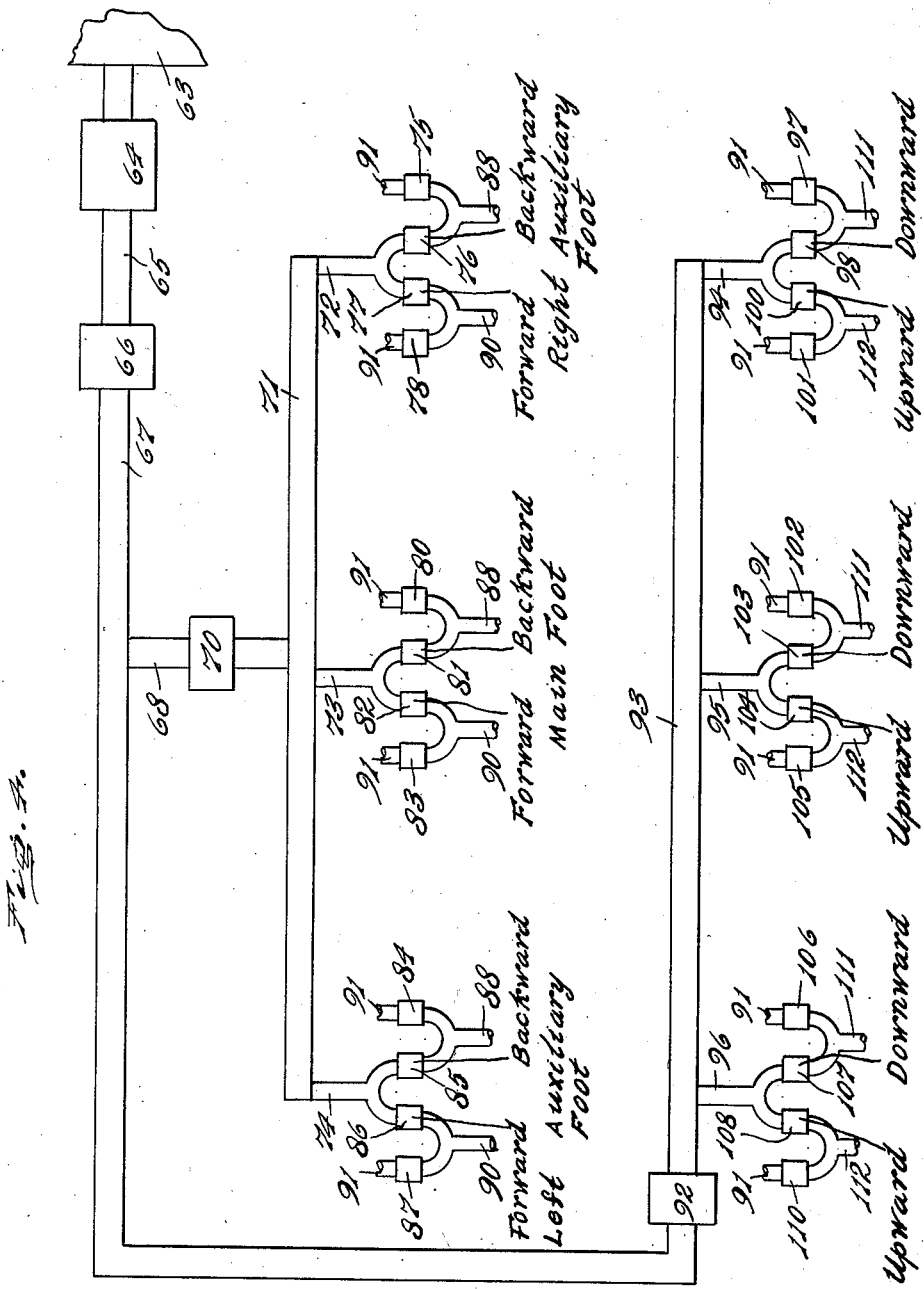

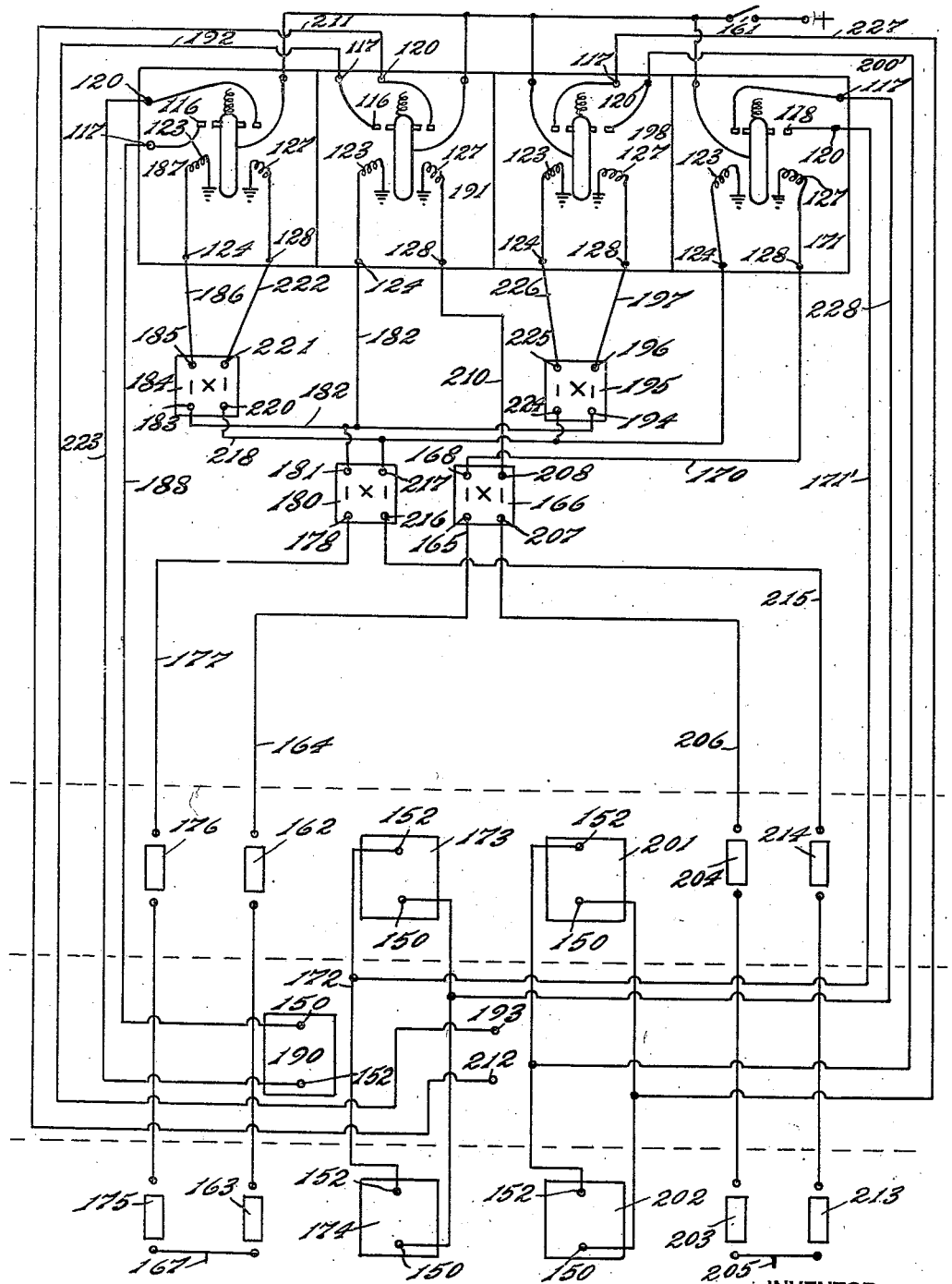

United States Patent Office 2,822,878
Patented Feb. 11, 1958

2,822,878

WALKING TRACTOR

Paul E. Corson, Williamsport, Pa.

Application January 7, 1954, Serial No. 402,731

7 Claims. (Cl. 180—8)

The present invention relates to tractors, particularly of the type which walk, and especially of the character which have fluid propulsion.

A purpose of the invention is to propel a tractor forwardly by alternately moving the cab forward with respect to a main foot and raising an auxiliary foot or feet off the ground, moving them forward and planting them on the ground, and then raising the main foot off the ground, moving it forward and planting it on the ground.

A further purpose is to propel the tractor while retaining the same relative position of the cab with respect to the ground.

A further purpose is to obtain more effective operation of a tractor in mud, swamp, seashore, river and lake bottom, jungle and other difficult territory.

A further purpose is to reduce to a minimum the tendency of a tractor to dig in or form a hole in difficult ground.

A further purpose is to provide horizontal and vertical guides between the main foot and the cab and between the auxiliary foot or feet and the cab, and to manipulate the feet in vertical and horizontal motion by fluid means.

A further purpose is to actuate the fluid means by limit switches to assure the completion of any particular part of the sequence of motion before the next part begins.

A further purpose is to pivot the tractor by holding one auxiliary foot planted on the ground in the same relative position with respect to the cab, to manipulate the opposite auxiliary foot in the usual manner, and to retain the main foot in unchanged horizontal position with respect to the cab, but moving it up and down as usual.

A further purpose is to steer the tractor by varying the stroke of one of the auxiliary feet, preferably by shorting out one of the limit switches before its normal action.

A further purpose is to employ a volume regulating valve between a source of fluid pressure and the fluid operating means for the feet as a throttle control.

A further purpose is to provide a volume regulating valve between the source of fluid pressure and the jack cylinders which assures a greater volume of fluid in a given time to the jack cylinders on the return stroke than on the thrust stroke.

A further purpose is to pivot support the main foot between two auxiliary feet on a vertical axis and to turn the tractor on the pivot of the main foot by movement of one of the auxiliary feet.

Further purposes appear in the specification and in the claims.

In the drawings I have chosen to illustrate a few only of the numerous embodiments of my invention, selecting the forms shown from the standpoints of convenience in illustration, satisfactory operation and clear demonstration of the principles involved.

Figure 3 is a longitudinal vertical section of the tractor of the invention on the line 3—3 of Figure 2.

Figure 4 is a diagrammatic hydraulic layout.

Figure 5 is an electric circuit diagram.

Figure 6 is a detail of the magnetic switch.

Figure 7 is a detail of the turn switch.

Figure 8 is a fragmentary central vertical section showing pivotal mounting of the main foot on a vertical axis.

Figure 1:
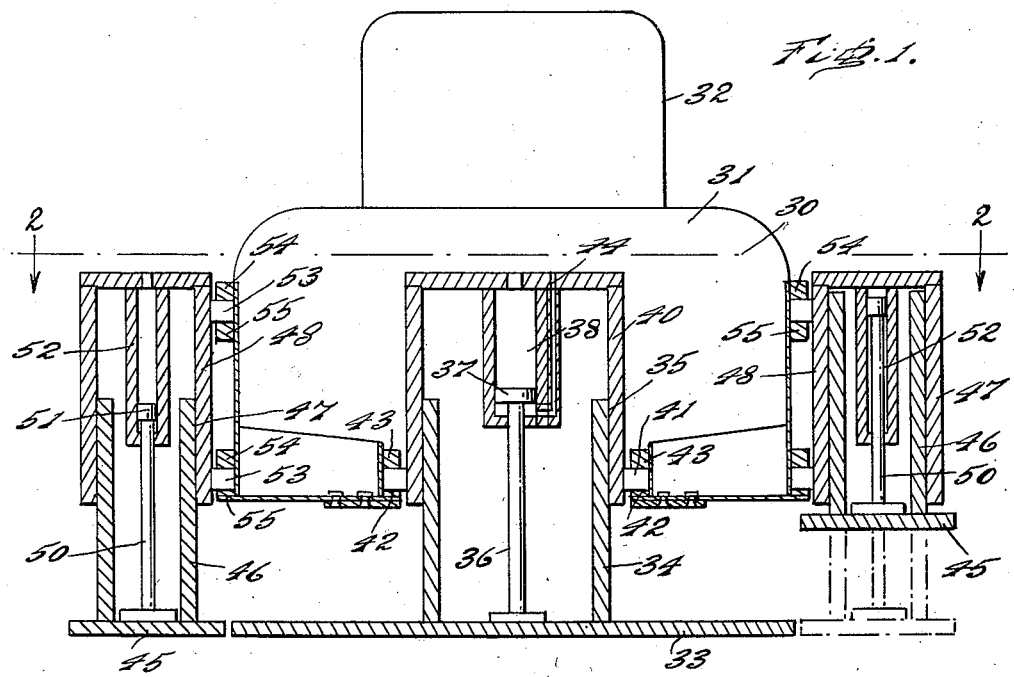
Figure 1 is a transverse vertical section through the tractor of the invention, the section being taken on the line 1—1 of Figure 2.

Describing in illustration but not in limitation and referring to the drawings.

Tractors and the like have been developed which employ a walking motion, but these devices are subject to an ungainly and uncomfortable gait, often lacking stability, but in many instances are complicated and relatively expensive to produce.

The present invention is concerned with the production of a tractor which will advance, turn and reverse by a walking motion, while the cab retains the same relative position with respect to the ground, so that the driver and other personnel are not subjected to bumping up and down and the equipment is not subjected to excessive impacts and shock.

The device is designed to avoid as far as possible the tendency of a tractor to dig in when it encounters difficult ground, so that it can be operated in swamps, mud, river and lake bottoms, seashores, and in jungle and brush.

The device is readily produced from relatively simple components, including guides for horizontal and vertical motion of the respective feet, and fluid operated cylinders to obtain the horizontal and vertical movements of the feet. Control is desirably accomplished automatically by limit switches, which assure that one element of motion has been completed before the next step occurs.

In the preferred motion of the device of the invention, a central main foot is placed in forward position on the ground, with auxiliary feet at either side resting on the ground in rear position. The cab is then moved forward with respect to the main foot, while the auxiliary feet are raised off the ground, carried forward and then planted again on the ground. In the next step the cab moves forward with respect to the auxiliary feet, while the main foot rises off the ground, moves forward and then is planted on the ground in forward position.

By making sure that the jacks firmly plant the feet without raising the cab, it is possible to progress even over ground which would be impractical for wheeled vehicles with little or no up-and-down movement of the cab. Thus the device makes tractor operation practical under ground conditions which are highly unfavorable.

The tractor of the invention can pivot effectively by freezing one auxiliary foot at a particular relative position with respect to the cab and on the ground, continuing operation of the auxiliary foot as usual, and merely alternately raising the main foot off the ground and planting it on the ground as required to take over support when the other auxiliary foot is moved forward.

Steering to accomplish slight variations in direction is desirably obtained by shorting one of the limit switches operating one of the auxiliary feet before its normal action, as desired.

In the hydraulic system in accordance with the invention a main pump suitably provided with a by-pass functions as a source of pressure, and distributes the fluid, preferably hydraulic oil or water, through a volume regulating valve which acts as a throttle. It is desirable to speed up motion on the rear stroke of the jacks, and volume regulator valves are desirably employed between the source of pressure and the cylinders so as to assure a greater volume in a given time to the cylinders on the rear strokes than on the downward or thrust strokes.

As an alternative, the main foot may, where desired, provide a pivotal support for the tractor on a vertical axis so that in close turns or pivoting the tractor can swing on this pivot.

Considering now the drawings in detail, the tractor of the invention comprises a cab 30 consisting of a body portion 31 which forms the frame structure, and a personnel-carrying and operating cab portion 32, which is suitably elevated at the front of the tractor and desirably located so that it will be immediately above the scraper blade in the case of a bulldozer. The portion 32 would be suitably at the rear in the case of a scraper so that the operator can watch the scraper blade as he is manipulating the vehicle.

Suitably disposed near the center of the cab, I place a main foot 33, which carries upstanding therefrom a vertical guide column 34, which is guided by vertical guides 35 assuring alignment in vertical motion.

Secured on main foot 33 inside the guides is a vertical piston rod 36 carrying a piston 37 which reciprocates in hydraulic jack cylinder 38 suitably mounted on a slide 40 which desirably forms part of the vertical guides 35.

It will be evident that the shape of the foot 33, while in one embodiment it may preferably be circular, will in other cases take other forms, suitably square, rectangular, or the like, and that the shape of the upstanding guide column 34 and the cooperating guides in horizontal section may be circular, rectangular, square, or otherwise.

Figure 2:
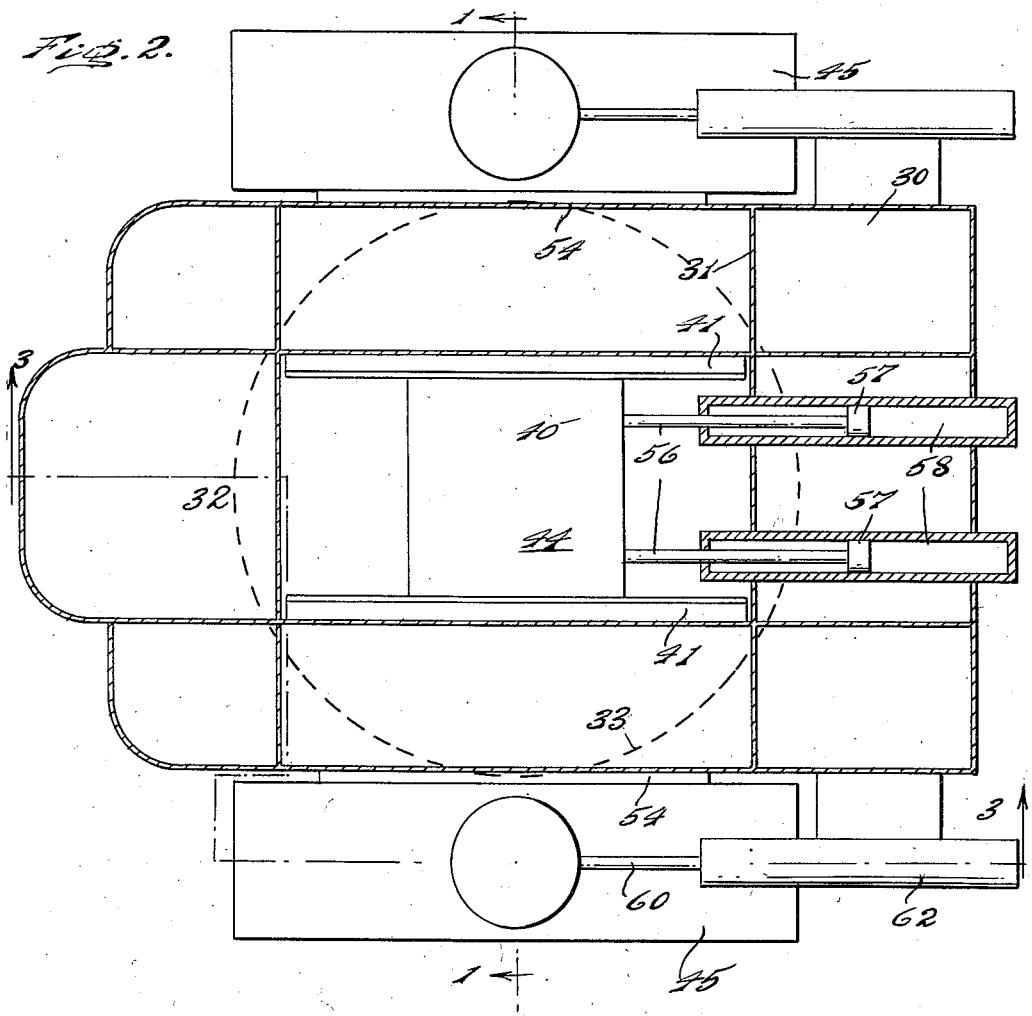
Figure 2 is a plan section of the device of Figure 1, the section being taken on the line 2—2 of Figure 1.

The slide 40, best seen in Figures 1 and 2, carries desirably at opposite side positions horizontally extending rails 41 which are guided for horizontal motion by horizontally extending shoes 42 and 43 which are on the cab.

It will be understood that the top 44 of the slide 40 can be used as a base for mounting an individual pump where separate hydraulic units are used for the different feet.

One or more auxiliary feet cooperate with the main foot in manipulating the tractor. The preferable arrangement is to mount two auxiliary feet 45 on opposite sides of the cab, with the main foot in the middle. It will, however, be understood that the invention is not restricted to the use of any particular number of auxiliary feet, and depending upon the size of the vehicle, the area which it covers in plan, and the tilting moment of the load, the invention may be applied with any suitable number of auxiliary feet. Likewise, it will be understood that two or more main feet can be used to cooperate with the auxiliary feet.

The auxiliary feet, as shown best in Figures 1, 2 and 3, are rectangular in shape, but it will be understood that they can be of any desired contour.

Each of the auxiliary feet has upstanding therefrom a column 46 which is in guiding relation with vertical guides 47 on a slide 48. The guides, while shown as circular, may, if desired, be of rectangular, square or other shape in horizontal section.

The top of the slide 48 is well adapted as a mounting base for an individual hydraulic pump if this is desired.

A jack piston rod 50 extends upwardly from each auxiliary foot, and at its upper end carries a piston 51 in a double acting fluid cylinder 52 which is mounted on the slide 48.

The slide 48 carries horizontally extending top and bottom rails 53 suitably of dovetail cross section, which are suitably placed one above another, and are in guiding relation with horizontally extending shoes 54 and 55 which are disposed on opposite sides of the cab and secured thereto. It will of course be understood that the rails and guides can be of any suitable mating shape (such as L-shaped or dovetail) and of any desired cross section.

The slide which supports the main foot is manipulated horizontally by piston rods 56 carrying pistons 57 which reciprocate in double acting fluid cylinders 58 mounted on the cab as shown in Figure 2.

Likewise the slides 48 for the auxiliary feet are manipulated horizontally by piston rods 60 carrying piston 61 in double acting fluid cylinders 62 mounted at the sides of the cab. It will of course be understood that the locations of the horizontally operating cylinders can be varied to suit the particular design.

A wide variety of different hydraulic systems may be used to accomplish the operation of the various cylinders, and the form shown in Figure 4 is suggestive of one embodiment which may be used.

According to this form, a pump 63 (Figure 4) of any suitable type, desirably driven by the main engine of the tractor, is provided with suitable output controls, including an output relief valve 64 which releases pressure at a predetermined pressure level, and permits internal recirculation of excess fluid to the pump, as well known. The automatic pressure relief valve 64 is connected by pipe 65 to a volume control valve 66 of any well known character, which connects through pipe 67 into branch pipe 68 to automatic volume control valve 70 which connects through pipe 71 into branch pipes 72, 73 and 74. These branch pipes connect to sets of normally closed solenoid operated valves 75, 76, 77 and 78; 80, 81, 82 and 83; and 84, 85, 86 and 87. The group of solenoid operated valves 75, 76, 77 and 78 control the hydraulic fluid to the right auxiliary foot cylinder for horizontal motion. The group of valves 80, 81, 82 and 83 controls the hydraulic fluid for the cylinder which regulates the horizontal movement of the main foot. The valves 84, 85, 86 and 87 control the hydraulic fluid to the cylinder which regulates the horizontal movement of the left auxiliary foot.

Valves 76 and 77; 81 and 82; and 85 and 86 are pressure valves which respectively connect by pipe 88 to the end of the appropriate cylinder which pushes the foot to the back and by pipe 90 to the end of the appropriate cylinder which pushes the foot to the front.

Valves 75 and 78; 80 and 83; and 84 and 87 are relief valves which connect to pipes 91 to the sump from which the pump 63 draws its inlet hydraulic liquid.

Pipe 67 connects also through automatic volume control valve 92 to pipe 93 supplying branch pipes 94, 95 and 96 which respectively connect to normally closed solenoid operated valves 97, 98, 100 and 101; 102, 103, 104 and 105; and 106, 107, 108 and 110. Valves 97 to 101 control vertical lifting and lowering of the right auxiliary foot, valves 102 to 105 control vertical lifting and lowering of the main foot and valves 106 to 110 control vertical lifting and lowering of the left auxiliary foot.

In each of these groups of valves, valves 98 and 100, 103 and 104; and 107 and 108 are pressure valves which connect respectively to pipe 111 which connects to the end of the appropriate cylinder which lowers the respective foot, and to pipe 112 which connects to the end of the appropriate cylinder which raises the particular foot. In these various groups, valves 97 and 101; 102 and 105; and 106 and 110 are relief valves connecting by pipes 91 to the sump.

The electric circuit is shown in Figure 5, and details of switch design of different switches are shown in Figures 6 and 7.

In the magnetic switches as shown in Figure 6, four of which are used in the construction, and movable contact bar 113 is pivoted at 114 on an insulating base 115. The contact bar is electrically conducting and carries an electrical contact 113' which is in electrical connection with the contact bar and in its opposite limiting position makes connection with contact 116 connected to terminal 117 or to contact 118 connected to terminal 120.

The contact bar 113 is electrically connected to terminal 121 which is connected to the ungrounded side of the source of electric power. The contact bar is energized to shift it from one position to the other by magnetically susceptible armature 122 pivotally mounted on the contact bar and extending through a magnet coil 123, one end of which is connected to terminal 124 and the opposite end of which is grounded at 125, and by opposing magnetically susceptible armature 126, pivoted on the contact bar and extending through magnet coil 127, one end of which is connected to terminal 128 and the other end of which is grounded at 130.

The magnet switch is spring biased toward either of its shifting positions by toggle spring mechanism 131 comprising a spring abutment 132 pivoted at the center at 133 on the base and having a guide bar 134 which receives a guiding projection 135 on an opposing spring abutment 136 which is pivoted at 137 on the end of the contact bar remote from the contact bar pivot. A spiral compression spring 138 acts between the abutment 132 and the abutment 136 to hold the abutments in one or the other opposite limiting position.

The circuit of Figure 5 also includes five magnetic turn switches of the character shown in Figure 7. A contact maker 140 suitably of insulating material is pivoted near one end at 141 on an insulating base 142 and is spring-urged by a spiral tension spring 143 toward the lefthand limiting position as shown. The contact maker carries in insulated relation from one another electrical contacts 144 and 145 mounted on the contact maker and respectively electrically connected to terminals 146 and 147.

In the lefthand position movable contact 144 engages fixed contact 148 connected to terminal 150 and movable contact 145 engages fixed contact 151 connected to terminal 152.

In the righthand position movable contacts 144 and 145 engage fixed contacts 153 and 154, both of which are connected to terminal 155 which in some of the turn switches is connected to the ungrounded side of the electric power source. Where this terminal is unconnected it is so stated later.

A magnetically susceptible armature 156 is pivotally connected to the contact maker and extends through magnet coil 157 which throws the turn switch, one side of the magnet coil being connected to terminal 158 which connects to the turn switch 230 in the cab, and the other end of which is grounded at 160.

With the knowledge of the hydraulic system and the magnetic switches and turn switches just described, the operation of the device will be understood in connection with the description of the electric circuit of Figure 5. Let us assume that at the beginning the main foot is planted on the ground and relatively to the rear of the cab, and the auxiliary feet are planted on the ground and relatively to the front of the cab. When the main power switch 161 in the cab is turned on, limit switches 162 and 163 which are closed and opened by the motion of the feet are in closed position, transmitting power from line 167 connected to the opposite side of the power source in the cab, through line 164 to contact 165 on reversing switch 166. With reversing switch 166 closed in the non-reversing position, current flows to contact 168 of the reversing switch and through lead 170 to terminal 128 of magnet switch 171. This energizes magnet coil 127 of this switch, moving the contact bar to the right and making contact between the source of power which is always connected to the contact bar and fixed contact 118 which is connected to terminal 120. Current then flows through line 171' to line 172 which connects to terminals 152 of turn switches 173 and 174. The current then flows to fixed contacts 151 of each of these turn switches and to movable contact 145 and thence to terminal 147, energizing solenoid valve 107 which lowers the left auxiliary foot and energizing relief valve 110 to release pressure to the sump from the opposite end of the cylinder, and also energizing and thereby opening hydraulic valve 98 which moves the right auxiliary foot down and relief valve 101 which relieves pressure from the other end of its cylinder. Thus it will be seen that turn switch 173 controls raising and lowering the left auxiliary foot and turn switch 174 controls raising and lowering the right auxiliary foot.

At the same time limit switches 175 and 176 are closed, sending power through line 167 from one side of the power source through line 177 to terminal 178 of the reversing switch 180 which is closed in non-reversing position and thence to terminal 181 of the reversing switch, to line 182 which connects to terminal 183 of reversing switch 184 in closed and non-reversing position, applying power to terminal 185 of the reversing switch 184 and thence to lead 186 and terminal 124 of magnetic switch 187. This shifts the movable contact bar of magnetic switch 187 to the left, applying power which is always applied to the movable contact bar to fixed contact 116 and terminal 117 which applies power to lead 188 which is connected to terminal 150 of turn switch 190 which controls front and back movement of the main foot. The power then flows through fixed contact 148 of turn switch 190 to movable contact 144 and to terminal 146 from which it flows to solenoid valves 82 and 80, admitting pressure to the side of the horizontal moving cylinder for the central foot which carries the foot forward and opening relief pressure at the opposite end.

At the same time that power enters lead 182 from reversing switch terminal 181 as above described, power is connected to terminal 124 of magnetic switch 191 which throws the magnetic switch to the left by energizing magnet coil 123 and connects power to fixed contact 116 and terminal 117. This energizes lead 192 connecting to terminal 193 which is connected to normally closed solenoid operated valves 104 and 102 which apply pressure to the side of the jack cylinder which raises the main foot and connect the opposite end of the cylinder to the sump.

It will also be evident that when line 182 is energized it energizes terminal 194 of reversing switch 195 which is closed in non-reversing position, which energizes terminal 196 and lead 197 to terminal 128 of magnetic switch 198. This energizes magnet coil 127, shifting the contact bar of magnetic switch 198 to the right and applying power to fixed contact 118 and terminal 120 to lead 200 which connects to terminals 152 of turn switches 201 and 202 which control the manipulation of the auxiliary feet toward the front and back. In the turn switches 201 and 202 current flows to terminals 147 and thence to the normally closed solenoid operated valves 85 and 87 and 76 and 78, moving the left and right auxiliary feet to the rear and relieving the opposite pressure in the cylinders. Since the auxiliary feet are actually on the ground the cab moves forward on the auxiliary feet.

The condition now reached is that the four forward limit switches 162, 163, 175 and 176 are closed. This raises the main foot and moves it forward at the same time moving the cab forward on the side feet. This continues until limit switches 203 and 204 are closed. Lead 205 is connected to the ungrounded side of the source of power through the main power switch in the cab, and power then flows through lead 206 to terminal 207 of reversing switch 166, which is closed in non-reversing position, and thence to terminal 208 and lead 210 and then to terminal 128 of magnetic switch 191, energizing magnet coil 127 to shift the magnet switch to the right and apply power to terminal 120 and thence through lead 211 to terminal 212 which is connected to energize and open normally closed hydraulic valves 103 and 105, lowering the main foot.

As the cab moves to the extreme forward position on the left and right auxiliary feet, limit switches 213 and 214 are closed, connecting power from line 205 to lead 215 and terminal 216 of reversing switch 180, closed in non-reversing position. Current flows then to terminal 217 and line 218 which performs a plurality of functions. This connects to terminal 220 of reversing switch 184, closed in non-reversing position, which connects to terminal 221, lead 222 and terminal 128 of magnetic switch 187, energizing magnet coil 127 to shift the magnetic switch to the right and apply power to terminal 120. Terminal 120 connects by lead 223 to terminal 152 of turn switch 190, which controls the relative front and back motion of the main foot. This energizes and opens hydraulic valves 81 and 83, moving the main foot to the rear.

Lead 218 also connects to terminal 224 of reversing switch 195, closed in non-reversing position, which connects to terminal 225 and lead 226 to terminal 124 of magnetic switch 198 to energize magnet coil 123 and shift the magnetic switch to the left, applying power to terminal 117 and lead 227 to terminals 150 of magnetic turn switches 201 and 202. This energizes and opens hydraulic valves 86 and 84 to move the left foot forward and 77 and 75 to move the right foot forward.

Lead 218 also applies power to terminal 124 of magnetic switch 171 shifting the contact maker to the left and energizing terminal 117 of this switch which connects the power to lead 228 and to terminals 150 of magnetic turn switches 173 and 174 which energize and therefore open hydraulic valves 108 and 106 which raise the left auxiliary foot, and hydraulic valves 100 and 97 which raise the right auxiliary foot.

It will be remembered that the cab has been moving forward on the right and left auxiliary feet, closing limit switches 203 and 204. When these switches were closed the main foot was lowered, and the cab continued on in forward motion until limit switches 213 and 214 were closed. When the center foot has been lowered, the auxiliary feet are raised and move forward in relation to the cab and the cab is moved forward in relation to the center foot.

When it is desired to reverse, the reversing switches are thrown to their reversing position and the operations above proceed except that relative forward movement takes place instead of relative rearward movement and vice versa, and everything happens as if what was formerly the front of the cab is now the rear.

When it is desired ot turn the tractor to the left, the left auxiliary foot is frozen in down position. The main foot is frozen in horizontal position and moves up and down while the right foot propels the tractor. The center foot holds the tractor in an upright position while the right foot is in a raised position moving forward for the next step. This is accomplished electrically by the following means:

Turn control switch 230 in the cab is closed, connecting power from the source to energize magnet coil 157 in turn switch 201. In this case contacts 153 and 154 are not connected to the ungrounded side of the power, terminal 155 being not connected, but contacts 144 and 148 and 145 and 151 are broken. Turn switch 173 is also connected similarly to turn control switch 230 and it has its magnet coil 157 energized at the same time, pulling movable bar 140 to the right and in this case the foot should be held in down position, so power from the ungrounded source is applied to terminal 155. This allows power to flow through contact 145 and terminal 147 which in turn energizes and opens hydraulic valves 107 and 110 and holding the left auxiliary foot in a down position. Turn switch 190 has its magnetic coil 157 energized moving the contactor 140 to the right. In this case there is no power connected to the contacts 153 and 154. Therefore no electric connection is made to the forward or rearward moving valves for the center foot.

The left foot is now in a lowered position and immovable in a forward or rearward position and the center foot is held immovable in a forward or rearward position. The right foot now proceeds in a normal manner as also the raising and lowering of the center foot. At the same time limit switches 214, 204, 162 and 176 are shorted out. If the turn is in the opposite direction, the exact reverse electrical procedure is followed. In order to simplify the electrical diagram the shorting switches for the limit switches and the turn switch connections to the terminals 158 are omitted.

If desired, the tractor can be powered by an engine driving an electric generator, with electric motors and hydraulic pumps individually supplying hydraulic pressure to the pipes 72, 73, 74, 94, 95 and 96. Variable speed motors are desirably employed in this case so that the volume can be controlled by the speed.

It will be noted on the hydraulic diagram of Figure 4 that all thrustors are controlled by automatic volume control valves 70 and 92. It will not be desirable to have the thrustors move faster on their return trip than on their power trip, although this can be done if desired. Valves 70 and 92 equalize the system. Valve 66 can be used as a throttle valve to control the speed of the tractor. Where separate electrically driven hydraulic pumps are used the speed of the electric motors can be used for control purposes.

It will be evident that whereas four separate valves are shown to control each hydraulic cylinder, four-way valves can be used if desired.

Figure 8 illustrates a form of the invention in which the main foot has a pivotal connection at 231 to the vertical guide column 34' so that the device can pivot on the main foot as an alternate means of turning.

It will be evident that one of the advantages of the device of the invention is that the cab will normally retain the same relative position to the ground as the tractor moves forward, and will not assume an uneven gait.

It will be evident, of course, that where different electric motors and pumps are used to actuate the thrustors for the two auxiliary feet, starting can be accomplished by simply sealing down one motor and the corresponding pump with respect to the other one, while freezing the horizontal thrust of the main foot in position planted on the ground.

It will further be evident that in starting up the device, it may be desirable to take precautions to be sure that the tractor does not proceed in an unexpected manner before the driver assumes control. It will, of course, be evident that the device is self-braking, so that you can retard motion by simply closing the throttle, although if desired this can be accomplished by applying hydraulic liquid on both sides of the thrustors controlling horizontal motion of feed on the ground. Similarly the reverse can be used as a brake.

It will be evident that the main foot is desirably operated in horizontal motion by two pistons and cylinders so as to counteract any rotational tendency which may be exerted on the main foot, particularly when turning. It will also be noted that this gives the advantage of making all of the cylinders, pistons and piston rods interchangeable.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my invention.

Having thus described my invention what I claim as new and desire to secure by Letters Patent is:

1. In a tractor, a cab, a main foot supporting the cab, vertical guides acting relatively between the main foot and the cab for guiding the main foot in vertical movement with respect to the cab, horizontal guides acting horizontally between the main foot and the cab for guiding the main foot in movement horizontally with respect to the cab, fluid operated means for raising and lowering the main foot beneath the cab, fluid operated means for projecting the main foot forwardly and rearwardly with respect to the cab, a pair of spaced auxiliary feet supporting the cab and located on either side of the main foot, vertical guide means acting between the cab and the auxiliary feet for guiding the auxiliary feet in relative up and down movement, horizontal guide means acting between the cab and the auxiliary feet for guiding the auxiliary feet in relative forward and rearward movement, fluid operating means for moving the auxiliary feet up and down with respect to the cab, fluid operating means for propelling the auxiliary feet forwardly and rearwardly with respect to the cab, means acting when the main foot is down supporting the cab for propelling the cab forward and for raising the auxiliary feet off the ground, moving them forward and lowering the auxiliary feet into supporting position on the ground, and means acting when the auxiliary feet are supporting the cab for propelling the cab forward and for raising the main foot off the ground, propelling the main foot and lowering the main foot into supporting position on the ground, the cab retaining substantially the same vertical position with respect to the ground as the tractor moves forward.

2. In a tractor, a cab, a main foot supporting the cab, auxiliary feet supporting the cab and located at opposite sides of the main foot, guides between the main foot and the cab for guiding the relative vertical motion of the main foot, guides between the main foot and the cab for guiding the relative horizontal motion of the main foot, guides between the auxiliary feet and the cab for guiding the relative vertical motion of the auxiliary feet, guides between the auxiliary feet and the cab for guiding the relative horizontal motion of the auxiliary feet, fluid operated means for moving the main foot vertically, fluid operated means for moving the main foot horizontally, fluid operated means for moving the auxiliary feet vertically, fluid operated means for moving the auxiliary feet horizontally, circuit means including limit switch means operative on motion of the cab relatively forwardly with respect to the auxiliary feet and on motion of the main foot forwardly with respect to the cab and downwardly to plant it on the ground, for operating the fluid operated means between the cab and the main foot to move the cab horizontally forward with respect to the main foot, for operating the fluid operated means to vertically lift the auxiliary feet off the ground, to operate the fluid operated means for moving the auxiliary feet horizontally to move the auxiliary feet relatively forward with respect to the cab, and to operate the fluid operated means for vertically moving the auxiliary feet with respect to the cab to lower the auxiliary feet and plant them on the ground, and electric circuit means including limit switch means operative upon completion of the above described forward motion of the auxiliary feet and forward motion of the cab and planting of the auxiliary feet on the ground in forward position for operating the fluid operated means for horizontally carrying the cab forward, for operating the fluid operated means to raise the main foot, to operate the fluid operated means to move the main foot horizontally forward and to operate the fluid operated means to move the main foot downwardly and plant it on the ground.

3. In a tractor, a cab, a main foot beneath the cab, vertical guide means between the main foot and the cab, fluid means for raising and lowering the main foot with respect to the cab, auxiliary feet on opposite sides of the cab, vertical guide means between the auxiliary feet and the cab, horizontal guide means between the auxiliary feet and the cab, fluid operated means for vertically raising and lowering the auxiliary feet with respect to the cab, fluid operated means for moving the auxiliary feet forwardly and rearwardly with respect to the cab, means operative while one auxiliary foot remains on the ground in a relatively invariable position with respect to the cab, while the main foot is on the ground, and the other auxiliary foot is in rear position on the ground, for raising the other auxiliary foot off the ground, moving it forward and again planting it on the ground, and means operative when the main foot is still in the invariable position with respect to the cab and planted on the ground and the other auxiliary foot is relatively forward with respect to the cab and planted on the ground for raising the main foot off the ground, moving the cab relatively forward with respect to the other auxiliary foot and planting the main foot again on the ground.

4. In a tractor, a cab, a main foot beneath the cab, vertical guide means between the main foot and the cab, fluid means for raising and lowering the main foot with respect to the cab, auxiliary feet on opposite sides of the cab, vertical guide means between the auxiliary feet and the cab, horizontal guide means between the auxiliary feet and the cab, fluid operated means for vertically raising and lowering the auxiliary feet with respect to the cab, fluid operated means for moving the auxiliary feet forwardly and rearwardly with respect to the cab, means operative while one auxiliary foot remains on the ground in a relatively invariable position with respect to the cab, while the main foot is on the ground and the other auxiliary foot is in rear position on the ground, for raising the other auxiliary foot off the ground, moving it forward and again planting it on the ground, and means operative when the main foot is still in the invariable position with respect to the cab and planted on the ground and the other auxiliary foot is relatively forward with respect to the cab and planted on the ground for raising the main foot off the ground, moving the cab relatively forward with respect to the other auxiliary foot and planting the main foot again on the ground, while retaining the same relative position of the cab with respect to the ground throughout.

5. In a tractor, a cab, a main foot beneath the cab, auxiliary feet on opposite sides of the main foot, vertical guide means between the main foot and the cab, horizontal guide means between the main foot and the cab, fluid operated means for moving the main foot vertically with respect to the cab, fluid operated means for moving the main foot horizontally with respect to the cab, vertical guide means between the auxiliary feet and the cab, horizontal guide means between the auxiliary feet and the cab, fluid operated means for moving the auxiliary feet vertically with respect to the cab, fluid operated means for moving the auxiliary feet horizontally with respect to the cab, means effective when the auxiliary feet are in forward position planted on the ground and the main foot is in rearward position planted on the ground to actuate the fluid operated means to raise the main foot off the ground, to actuate the fluid operated means to move the cab forward on the auxiliary feet relatively different distances for steering purposes and then to operate the fluid actuated means for moving the main foot downwardly and for planting the main foot on the ground, and means subsequently effective for actuating the fluid operated means to raise the auxiliary feet off the ground, to actuate the fluid operated means to move the auxiliary feet forward, and to actuate the fluid operated means to plant the auxiliary feet on the ground.

6. In a tractor, a cab, a main foot beneath the cab, auxiliary feet on opposite sides of the cab, vertical and horizontal guides between the respective feet and the cab, vertical and horizontal fluid actuated means to manipulate each of the feet in its guides and control its relative position with respect to the cab, a source of fluid pressure, outgoing and return lines between the source of fluid pressure and the fluid actuated means, means effective when the main foot is in forward position and planted on the ground and the auxiliary feet are in rear position and planted on the ground for actuating the fluid operated means to move the cab forward with respect to the main foot in an invariable position with respect to the ground, to raise the auxiliary feet off the ground, move them forward and again plant them on the ground, subsequently operative means for actuating the fluid operated means to move the cab forward with respect to the auxiliary feet in an invariable position with respect to the ground, to raise the main foot off the ground, move it forward and plant it on the ground and a throttle valve between the source of fluid pressure and the fluid actuated means.

7. In a tractor, a cab, a main foot beneath the cab, a jack extending beneath the cab, a pivotal connection on a vertical axis between the main foot and the jack, horizontal guide means interconnecting the jack and the cab, fluid operated means for moving the jack and the main foot horizontally with respect to the cab, auxiliary feet at each side of the cab, jacks connecting the auxiliary feet with the cab, horizontal guide means mounting the jacks for the auxiliary feet, fluid operated means for moving the jacks of the auxiliary feet forwardly and rearwardly, means operative when the main foot is forward and planted on the ground and the auxiliary feet are rearward and planted on the ground for moving the cab relatively forward, raising the auxiliary feet off the ground, moving them forward and planting them on the ground, and subsequently operative means for moving the cab relatively forward with respect to the auxiliary feet, raising the main foot, moving it forward and planting it on the ground, the cab retaining an invariable potion with respect to the ground.

References Cited in the file of this patent

UNITED STATES PATENTS

| | | |
|---|---|---|
| 1,704,866 | Morgan | Mar. 12, 1929 |
| 2,062,657 | Joy | Dec. 1, 1936 |
| 2,452,632 | Cameron | Nov. 2, 1948 |
| 2,660,253 | Davidson | Nov. 24, 1953 |